(12) United States Patent
Ogawa et al.

(10) Patent No.: US 7,778,731 B2
(45) Date of Patent: Aug. 17, 2010

(54) LEGGED MOBILE ROBOT CONTROL SYSTEM

(75) Inventors: Naohide Ogawa, Wako (JP); Satoshi Shigemi, Wako (JP)

(73) Assignee: Honda Motor Co., Ltd, Minato-Ku, Tokyo (JP)

( * ) Notice: Subject to any disclaimer, the term of this patent is extended or adjusted under 35 U.S.C. 154(b) by 752 days.

(21) Appl. No.: 11/636,999

(22) Filed: Dec. 12, 2006

(65) Prior Publication Data
US 2007/0150107 A1 Jun. 28, 2007

(30) Foreign Application Priority Data
Dec. 12, 2005 (JP) ............... 2005-358229

(51) Int. Cl.
G06F 19/00 (2006.01)
(52) U.S. Cl. ........... 700/245; 700/260; 700/261; 318/568.12; 901/1; 901/2; 901/33
(58) Field of Classification Search ......... 700/245, 700/254, 260, 261; 318/566, 568.12, 568.17; 345/473, 474, 475; 901/1, 2, 33, 45, 48
See application file for complete search history.

(56) References Cited

U.S. PATENT DOCUMENTS

| | | | |
|---|---|---|---|
| 6,220,104 B1 | 4/2001 | Yoshino et al. | |
| 6,266,576 B1 * | 7/2001 | Okada et al. ............. | 700/245 |
| 6,583,595 B1 * | 6/2003 | Hattori et al. ............ | 318/567 |
| 6,819,978 B2 * | 11/2004 | Funada .................... | 700/245 |
| 6,897,631 B2 * | 5/2005 | Miyazaki et al. ........ | 318/568.12 |
| 2002/0022907 A1 * | 2/2002 | Takenaka et al. ........ | 700/245 |
| 2002/0068996 A1 * | 6/2002 | Hirose ..................... | 700/245 |
| 2002/0103576 A1 * | 8/2002 | Takamura et al. ....... | 700/245 |
| 2002/0181723 A1 * | 12/2002 | Kataoka ................... | 381/92 |
| 2004/0013295 A1 * | 1/2004 | Sabe et al. ............... | 382/153 |
| 2004/0101192 A1 * | 5/2004 | Yokoyama ............... | 382/153 |

(Continued)

FOREIGN PATENT DOCUMENTS

JP 2001-212783 8/2001

(Continued)

OTHER PUBLICATIONS

Sakagami et al., The intelligent ASIMO: system overview and integration, Oct. 2002, IEEE, Intl conference on intelligent robots and systems, 0-7803-7398-7/02, pp. 2478-2483.*

(Continued)

*Primary Examiner*—Khoi Tran
*Assistant Examiner*—Jaime Figueroa
(74) *Attorney, Agent, or Firm*—Squire, Sanders & Dempsey L.L.P.

(57) ABSTRACT

In a control system of a legged mobile robot having a body and legs connected to the body and driven by a leg actuator, there is provided an operation controller which generates gaits based on an external force, more specifically gaits for walking by taking a hand of a human being or with the hand being taken by the hand of the human being and controls operation of at least the leg actuator based on the generated gaits. With this, it becomes possible to control the robot to come contact with a human being to establish communication therewith, while enabling to keep a stable posture during the contact.

11 Claims, 11 Drawing Sheets

U.S. PATENT DOCUMENTS

| | | | |
|---|---|---|---|
| 2005/0222713 A1* | 10/2005 | Kawabe et al. | 700/259 |
| 2006/0049944 A1* | 3/2006 | Ishiguro et al. | 340/572.1 |
| 2006/0061316 A1* | 3/2006 | Aihara et al. | 318/568.12 |
| 2006/0129278 A1* | 6/2006 | Sugiyama et al. | 700/245 |
| 2007/0152619 A1* | 7/2007 | Sugiyama et al. | 318/568.12 |

FOREIGN PATENT DOCUMENTS

| | | |
|---|---|---|
| JP | 2004-283975 | 10/2004 |
| JP | 2004-302905 | 10/2004 |
| JP | 2005-291716 | 10/2005 |
| JP | 2006-195969 | 7/2006 |
| WO | WO 02/40224 | 5/2002 |

OTHER PUBLICATIONS

Honda Motor co.,Honda reveals technologies next generation ASIMO, Dec. 15, 2004, Internet, news 2004, pp. 1-3.*

Honda Motor co, Introducing a new ASIMO featuring intelligence technology, Dec. 5, 2002, Internet, news 2002, pp. 1-3.*

Nakano et al., A two layer model for behavior and dialogue planning in conversational service robots, Aug. 2005,IEEE,0-7803-8912-3, pp. 1-7.*

Kemmotsu et al., Recognizing human behaviors with vision sensors in network robot systems, Nov. 2005, 1st Japan Korea joint symposium on network robot systems, JK-NRS2005, pp. 1- 6.*

Jung-Yup Kim et al., System design and dynamic walking of humanoid robot KHR-2, Apr. 2005, IEEE, pp. 1432-1436.*

European Search Report application No. 06025604.7 dated Sep. 26, 2008.

Harada, K. et al., "Real-Time Planning of Humanoid Robot's Gait for Force Controlled Manipulation", Robotics and Automation, Apr. 2004, pp. 616-622.

Takubo, T. et at., "Pushing an Object Considering the Hand Reflect Forces by Humanoid Robot in Dynamic Walking", Robotics and Automation, Apr. 2005, pp. 1706-1711.

* cited by examiner

LEGGED MOBILE ROBOT CONTROL SYSTEM

CROSS-REFERENCE TO RELATED APPLICATION

This invention claims priority under 35 USC 119 based on Japanese Patent Application No. 2005-358229, filed on Dec. 12, 2005, the entire disclosure of which is incorporated herein by reference.

BACKGROUND OF THE INVENTION

1. Field of the Invention

This invention relates to a legged mobile robot control system, particularly to a legged mobile robot control system that controls the robot to walk with a human being with hand in hand.

2. Description of the Related Art

There has hitherto been proposed a robot which is configured to be capable of shaking hands with a human being, as taught by Japanese Laid-Open Patent Application No. 2004-283975, for example. This prior art robot mentioned in this reference has hands embedded with pressure-sensitive sheets for detecting the grasping force of the human being at hand-shaking and is controlled to change the contents of utterance and motion of arms in response to the detected grasping force. For example, this robot is controlled to utter as "Nice to meet you", when the grasping force is moderate, but is controlled to utter as "Ouch" and to draw in the arm when the grasping force is excessive, thereby enabling to establish communication with human beings. This robot mentioned in the reference comprises a body like a human's upper body mounted on wheels.

Examples to establish communication with human beings will involve not only shaking hands with a human being, but also walking with hand in hand, i.e., walking while taking a human being's hands or walking while its hand being taken by a human being. When the robot comes into contact with a human being in this manner, like handshaking, the robot receives an external force of a considerable amount from him/her.

Since the robot mentioned in the reference is a wheeled robot, the external force acting through its arm will not cause the robot to lose stability unless the external force is quite large. However, in the case of a legged mobile robot such as a biped robot, the external force may sometimes be a disturbance enough to cause the legged mobile robot to lose stability. Thus the legged mobile robot is likely to lose stability when coming into contact with a human being.

SUMMARY OF THE INVENTION

An object of this invention is therefore to solve the foregoing drawback of the prior art by providing a legged mobile robot control system that can control the robot to come contact with a human being to establish communication therewith, while enabling to keep a stable posture during the contact.

In order to achieve the object, this invention provides a system for controlling a legged mobile robot having a body, a plurality of legs each connected to the body, a plurality of arms each connected to the body and each having a hand at its distal end, a leg actuator for driving the legs and an arm actuator for driving the arms, comprising: a force sensor which detects an external force acting from a human being when coming in contact with the human being through the hand; and an operation controller which generates gaits based on the detected external force, and controls operation of at least the leg actuator based on the generated gaits.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of a legged mobile robot control system according to the invention will now be explained with reference to the attached drawings.

Figure 1:
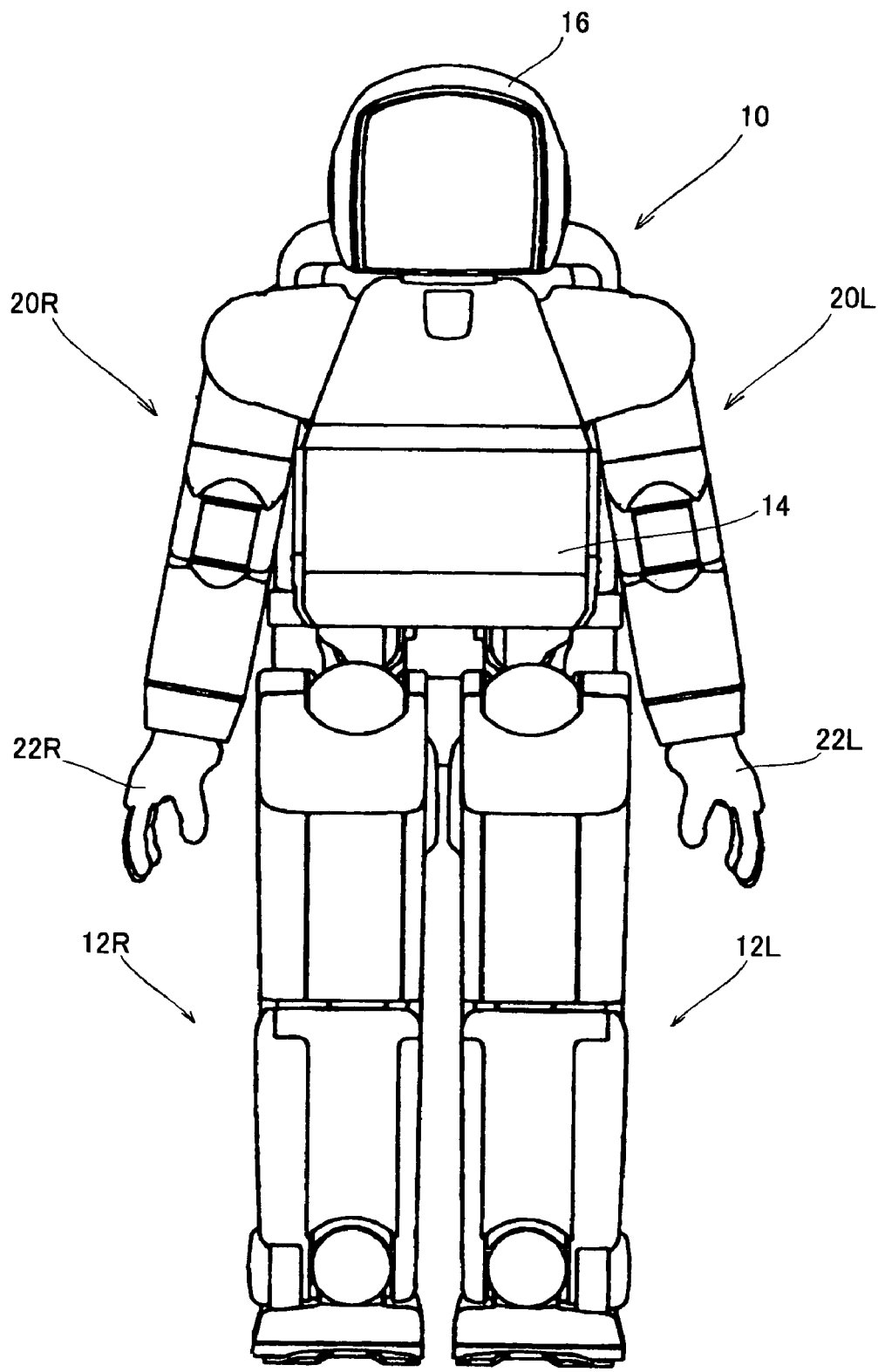
FIG. 1 is a front view of a legged mobile robot to which a legged mobile robot control system according to a first embodiment of the invention is applied.
Figure 2:
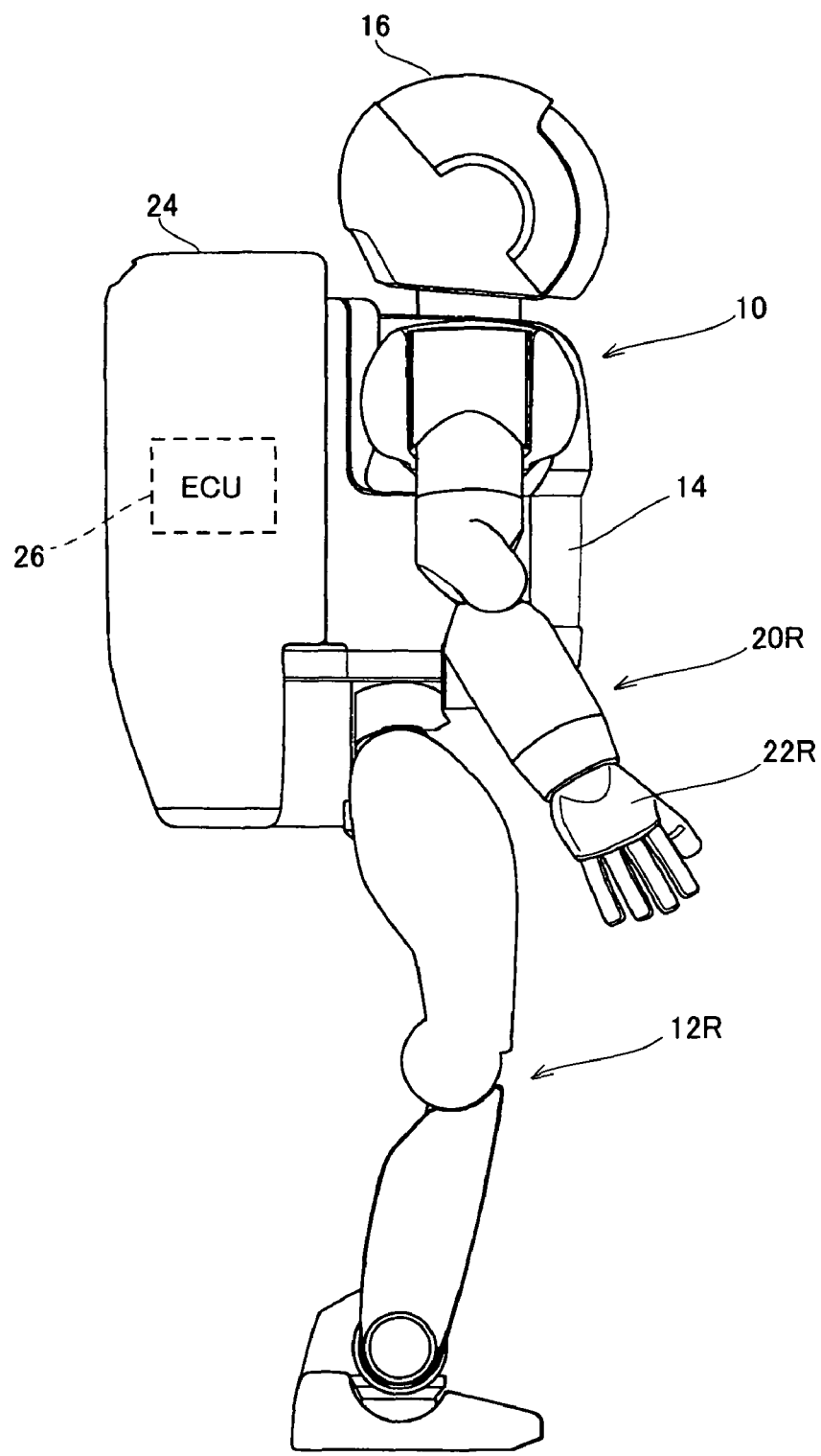
FIG. 2 is a side view of the robot shown in FIG. 1.

FIG. 1 is a front view of a legged mobile robot to which a legged mobile control system according to an embodiment of the invention is applied and FIG. 2 is a side view of the robot.

As shown in FIG. 1, the legged mobile robot (hereinafter referred to as "robot") 10 is equipped with a plurality of, specifically a pair of right and left legs 12R, 12L (R and L indicating the right and left sides; hereinafter the same). The legs 12R, 12L are connected to the lower end of a body (upper body) 14. A head 16 is connected to the upper end of the body 14 and a plurality of, specifically a pair of right and left arms 20R, 20L are connected to opposite sides of the body 14. Hands (end effectors) 22R, 22L are attached to the distal ends of the arms 20R, 20L.

A humanoid legged mobile robot (mobile robot modeled after the form of the human body) provided with two legs and two arms, in approximately 1300 mm height, and capable of bipedal locomotion, is taken as an example of the legged mobile robot.

As shown in FIG. 2, a housing unit 24 is mounted on the back of the body 14 for accommodating an electronic control unit (hereinafter referred to as "ECU") 26, a battery and the like. The robot 10 shown in FIGS. 1 and 2 is equipped with covers for protecting its internal structures.

Figure 3:
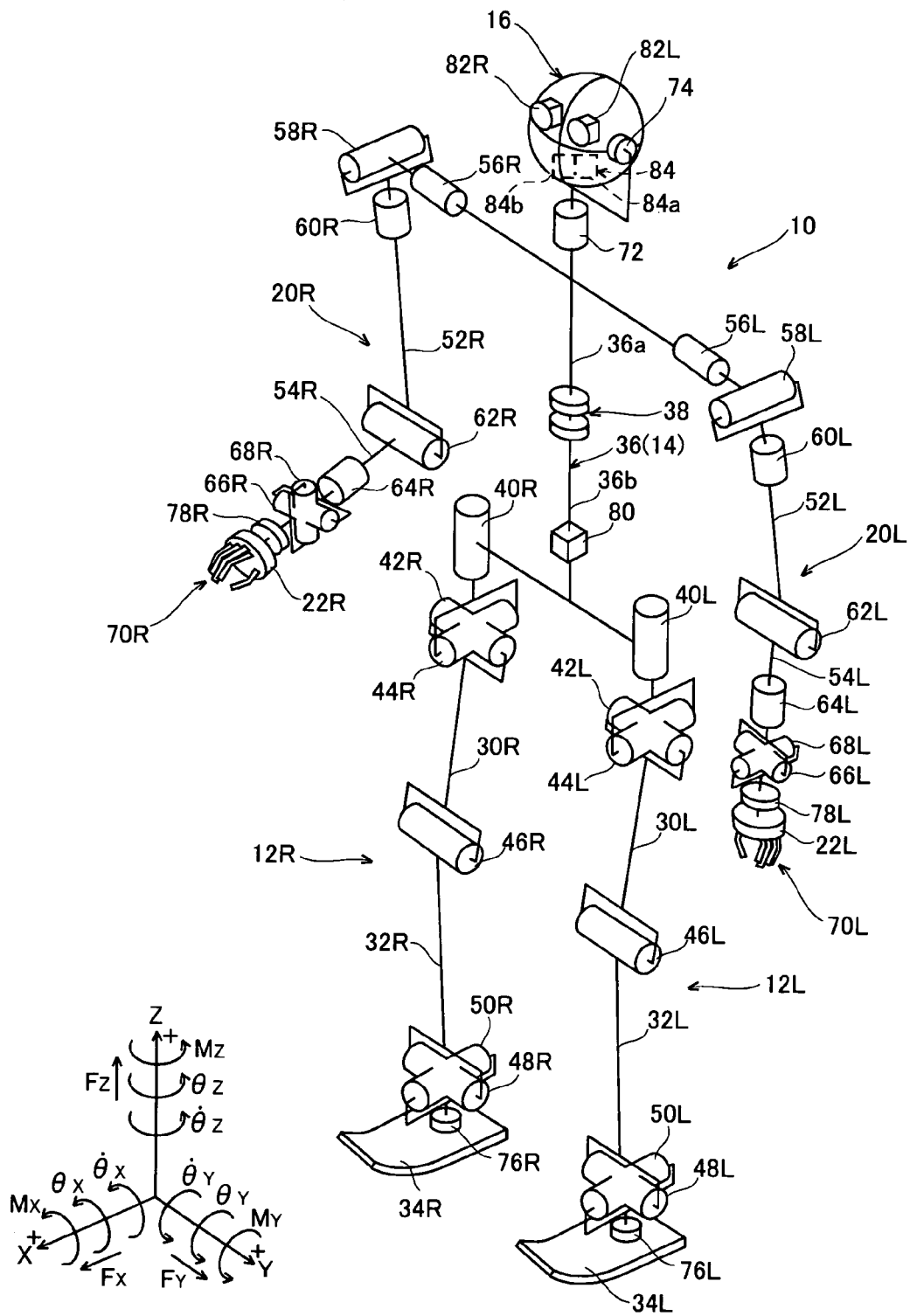
FIG. 3 is an explanatory view showing a skeletonized view of the robot shown in FIG. 1.

FIG. 3 is an explanatory diagram showing a skeletonized view of the robot 10. The internal structures of the robot 10 will be explained with reference to this drawing, with primary focus on the joints. Since the robot 10 is symmetric with respect to the right and left, the addition of R, L will be omitted in the followings.

As illustrated, each of the right and left legs 12 has a thigh link 30, a shank link 32 and a foot 34. The thigh link 30 is connected to the body 14 through hip (crotch) joint. The body 14 is represented in FIG. 3 simply by a body link 36 whose upper half 36a and lower half 36b are made displaceable with each other, i.e., rotatable with each other.

The thigh link 30 and the shank link 32 are connected by a knee joint, while the shank link 32 and the foot 34 are connected by an ankle joint. The hip joint comprises a rotary shaft 40 rotatable about a Z-axis (yaw axis or vertical axis), a rotary shaft 42 rotatable about a Y-axis (pitch axis; an axis in the right-and-left direction of the robot 10), a rotary shaft 44 rotatable about an X-axis (roll axis; an axis in the back-and-forth direction of the robot 10). The hip joint has three degrees of freedom.

The knee joint comprises a rotary shaft 46 rotatable about the Y-axis and has one degree of freedom. The ankle joint comprises a rotary shaft 48 rotatable about the Y-axis and a rotary shaft 50 rotatable about the X-axis and has two degrees of freedom. Thus, the each of the right and left legs 12 is imparted with six rotary shafts (six degrees of freedom) constituting the three joints and hence, the right and left legs 12 have twelve rotary shafts as a whole.

The legs 12 are driven by actuators (not shown). The actuators that drive the legs 12 (hereinafter generally referred to as "leg actuator") comprise twelve electric motors installed at the body 14 and the legs 12 which drive the aforesaid twelve rotary shafts respectively. The legs 12 can thus be imparted with desired movement when the operation of the leg actuator is controlled to drive the respective rotary shafts to appropriate angles.

Similarly, each of the right and left arms 20 has an upper arm link 52 and a lower arm link 54. The upper arm link 52 is connected to the body 14 through a shoulder joint. The upper arm link 52 and the lower arm link 54 are connected by an elbow joint, while the lower arm link 54 and the hand 22 are connected by a wrist joint.

The shoulder joint comprises a rotary shaft 56 rotatable about the Y-axis, a rotary shaft 58 rotatable about the X-axis and a rotary shaft 60 rotatable about the Z-axis, and has three degrees of freedom. The elbow joint comprises a rotary shaft 62 rotatable about the Y axis and has one degree of freedom. The wrist joint comprises a rotary shaft 64 rotatable about the Z-axis, a rotary shaft 66 rotatable about the Y-axis and a rotary shaft 68 rotatable about the X-axis and has three degrees of freedom. Thus, the each of the right and left arms 20 is imparted with seven rotary shafts (seven degrees of freedom) constituting the three joints and hence, the right and left arms 20 have fourteen rotary shafts as a whole.

The arms 20 are also driven by actuators (not shown). The actuators that drive the arms 20 (hereinafter generally referred to as "arm actuator") comprise fourteen electric motors installed at the body 14 and the arms 20 which drive the aforesaid fourteen rotary shafts respectively. The arms 20 can be imparted with desired movement when the operation of the arm actuator is controlled to drive the respective rotary shafts to appropriate angles.

The hands 22 are each equipped with five fingers 70 which are configured to be driven by actuators (not shown; hereinafter generally referred to as "hand actuator") to carry out a task, such as grasping an object, pointing a certain direction, in cooperation with the movement of the arms 20.

The head 16 is connected to the body 14 through a neck joint. The neck joint comprises a rotary shaft 72 rotatable about the Z-axis and a rotary shaft 74 rotatable about the Y-axis and has two degrees of freedom. The rotary shafts 72, 74 are configured to be driven by actuators (not shown; hereinafter generally referred to as "head actuator") respectively. The head 16 can be moved to turn the face of the robot 10 to a desired direction when the operation of the head actuator is controlled to drive the respective rotary shafts 72, 74 to appropriate angles.

Similarly, the body link 36, i.e., the body 14 is driven by a body actuator (not shown) installed at the joint 38 such that the upper half 36a and lower half 36b rotates to each other.

A force sensor (six-axis force sensor) 76 is attached to each of the right and left legs 12 at a location between the foot 34 and the ankle joint. The force sensor 76 produces signals representing the force components Fx, Fy and Fz of three directions and the moment components Mx, My and Mz of three directions of the floor reaction force acting from the floor to the legs 12, more precisely the floor reaction force acting on the robot 10 through the legs 12.

Similar force sensor (six-axis force sensor) 78 is also attached to each of the arms 20 at a location between the wrist joint and each hand 22 and produces signals representing force components Fx, Fy and Fz of three directions and moment components Mx, My and Mz of three directions of external force acting on the hands 22 and arms 20, more specifically external force acting on the robot 10 through the hands 22 and arms 20.

In addition, an inclination sensor 80 is installed on the body 14 and produces a signal representing the quantity of state including the inclination of the body 14, i.e., the inclination angle and angular velocity of the body 14 relative to the vertical axis (Z-axis). The interior of the head 16 is equipped with a pair of right and left CCD cameras 82 which can produce stereoscopic images of the environmental space, and a voice input/output device 84 comprising a microphone 84a and a speaker 84b.

The outputs of the force sensors 76 etc., are inputted to the ECU 26 (shown in FIG. 2) that comprises a microcomputer having a CPU, input/output circuits, a ROM and a RAM, etc.

Figure 4:
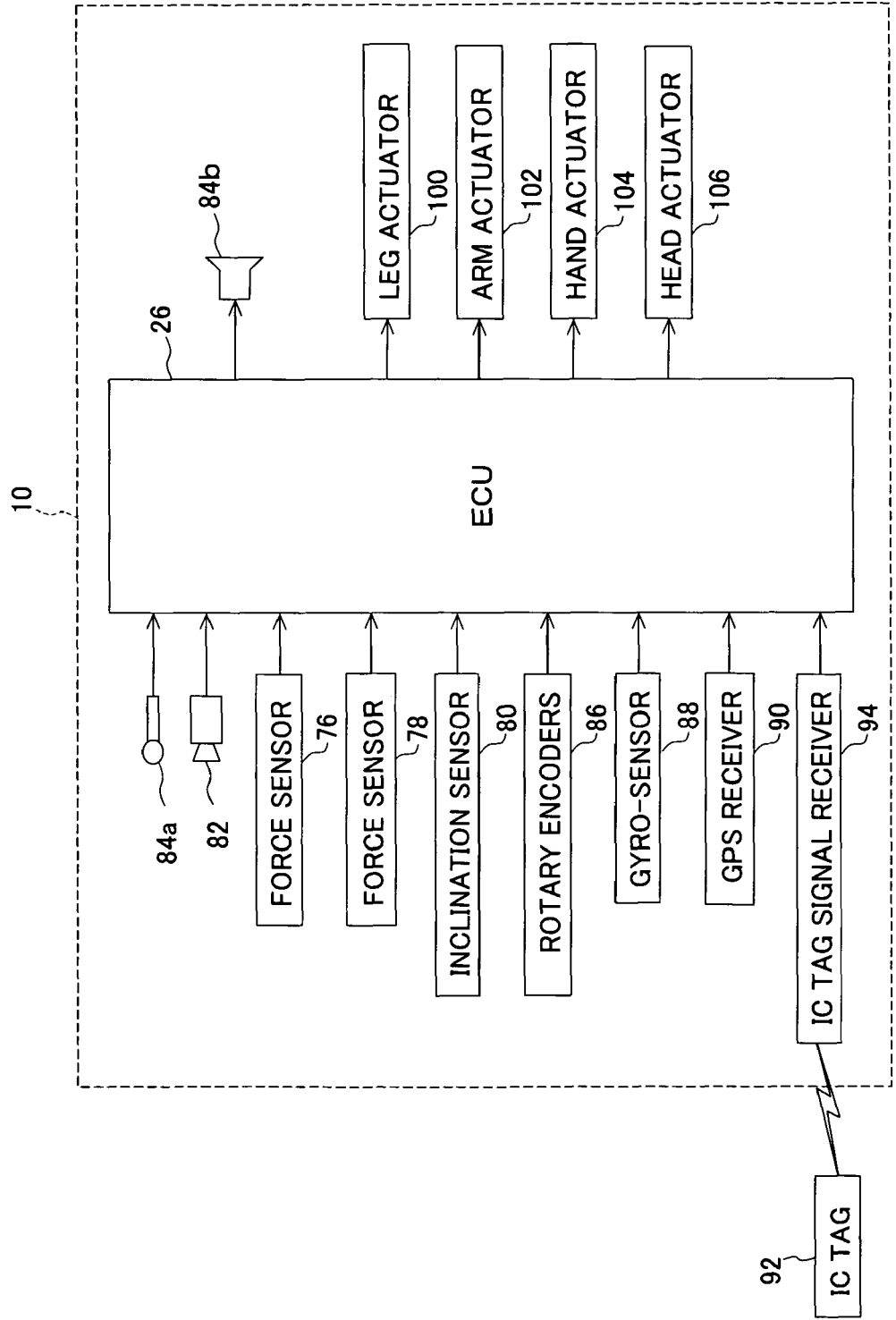
FIG. 4 is a block diagram showing the configuration of the robot through inputs to and outputs from an electronic control unit (ECU) illustrated in FIG. 2.

FIG. 4 is a block diagram showing the configuration of the robot 10 through inputs to and outputs from the ECU 26.

In addition to the aforesaid sensors, the robot 10 is equipped with rotary encoders (generally assigned by reference numeral 86) each installed at the respective rotary shafts 40, 42, 44, . . . , a gyro-sensor 88, a GPS (Global Position System) receiver 90, an IC tag signal receiver or reader 94 which receives an IC tag information transmitted from an IC tag 92 each carried by a human being concerned in radio communication.

Each of the rotary encoders 86 produces a signal or output indicative of the angle of rotation, i.e., the joint angle of the associated rotary shafts 40, 42, 44, . . . . The gyro-sensor 88 produces a signal or output indicative of the direction and distance that the robot 10 moves. The GPS receiver 90 receives radio wave transmitted from a satellite to acquire positional information in latitude and longitude and outputs it to the ECU 26. The IC tag signal receiver 94 receives the IC tag information that is RFID (Radio Frequency Identification) information to identify a human being who carries the corresponding IC tag 92 and outputs it to the ECU 26.

The ECU 26 generates gaits based on the outputs from the force sensors 76, 78, inclination sensor 80 and rotary encoders 86 and performs walking control based on the generated gaits. Specifically, the ECU 26 controls operation of the leg actuator (now assigned with reference numeral 100 in the figure) to drive the legs 12 such that the robot 10 moves or walks.

At the same time, the ECU 26 controls operation of the arm actuator (now assigned with reference numeral 102) and the hand actuator (now assigned with reference numeral 104) to drive the arms 20 and hands 22, and controls operation of the head actuator (now assigned with reference 106) to move the head 16 so as to turn the robot face to an appropriate direction. Since the walking of the robot 10 is controlled in the same manner as described in International Laid-Open Patent Application WO 02/40224 A1 filed by the applicant, the explanation is omitted here.

In addition, the ECU 26 operates to walk with a human with hand in hand after having identified him/her based on the outputs from the CCD cameras 82 and IC tag signal receiver 94, etc.

Figure 5:
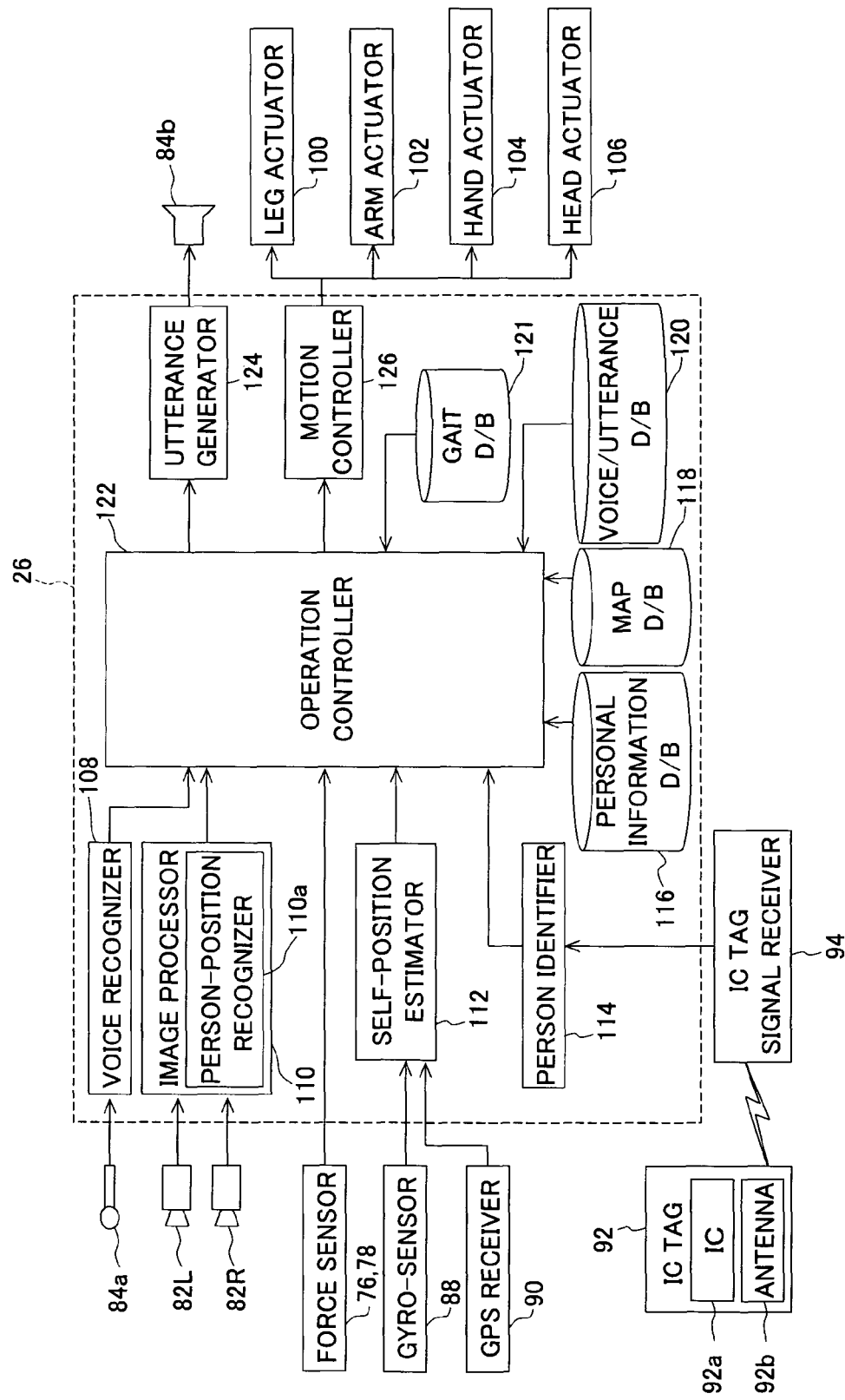
FIG. 5 is a block diagram showing the configuration of the electronic control unit illustrated in FIG. 4 in a functional manner.

FIG. 5 is a block diagram showing the configuration of the ECU 26 in a functional manner.

As illustrated, the ECU 26 is equipped with, inter alia, a voice recognizer 108, image processor 110, self-position estimator 112, person identifier 114, personal information database (D/B) 116, map database (D/B) 118, voice/utterance database (D/B) 120, gait database (D/B) 121, operation controller 122, utterance generator 124 and motion controller 122.

They will be explained individually. The voice recognizer 108 inputs the voices of human beings concerned, operator and the like collected from the microphone 84a of the voice input/output device 84 and recognizes instruction or intention of the human beings concerned and the like based on vocabulary stored in the voice/utterance database 120.

The image processor 110 has a person-position recognizer 110a which inputs the stereoscopic images taken and produced by the two CCD cameras 82 and from parallax of the inputted stereoscopic images, creates distance information of the object. The person-position recognizer 110a inputs images taken by one of the CCD cameras 82 at different times, calculates differences between the images to extract regions where the object moves, and recognizes the position of the human beings and the distance thereto.

The self-position estimator 112 estimates the current position of the robot 10 based on the GPS signal inputted through the GPS receiver 90. When the GPS signal is absent, it estimates the position based on the direction and distance of the robot 10 detected by the gyro-sensor 88.

Based on the identification signal (RFID information) of the IC tag 92 inputted through the IC tag signal receiver 94, the person identifier 114 identifies a human being, more specifically the human being whose position is recognized by the person position recognizer 110a. The IC tag 92 is carried by every person and comprises an Integrated Circuit 92a that stores the identification signal of the carrying person, and an antenna 92b that transmits the identification signal to the IC tag signal receiver 94 in radio communication, etc. Needless to say, the different IC tag 92 contains different identification information.

The personal information database 116 stores the personal information of the every person who carries the IC tag 92. The personal information comprises height, sex, face image and any other information including social character such as the name of organization the human being belongs to. The map database 118 stores a map (map information) of the walking environment such as the building of a company where the robot 10 is placed. The voice/utterance database 120 stores the aforesaid vocabulary or words.

The gait database 121 stores gaits comprising patterns of desired motion of the robot and floor reaction forces thereof, specifically motion patterns comprising trajectories of desired position/posture of the body 14 and trajectories of desired position/posture of the foot 34, and floor reaction force patterns comprising trajectories of desired total floor reaction force and its central point to be acted on the legs 12. The central point of the total floor reaction force is the same as Zero Moment Point.

The operation controller 122 generates gaits to walk with a human being while taking his/her hand by its hand 22 or while being taken its hand 22 by his/her hand, based on the gaits stored in the gait database 121, and controls operation of the leg actuator 100, arm actuator 102, hand actuator 104 and head actuator 106 through the motion controller 126. Further, the operation controller 122 generates synthesized voice signal and drives the speaker 84b of the voice input/output device 84 to utter words.

This operation performed by the operation controller 122 will be explained with reference to the flowchart of FIG. 6. The operation mentioned there is to walk with the hand 22R or 22L being taken by a human being's hand.

First in S10, the robot 10 is controlled to find a human being, i.e., a partner who will take the hand 22R or 22L to walk. This is done from the output of the image processor 110, i.e., the images taken by the CCD cameras 82 and processed by the image processor 110. Since the partner should carry the IC tag 92, this is also done by using the identification signal being transmitted from the IC tag 92 to the IC tag signal receiver 94, or by both of them. Alternatively, this may be done by inputting a command by the operator from the exterior of the robot 10.

When the robot 10 finds the partner, the robot 10 is controlled in S12 to move to approach the person and it is controlled in S14 to determine whether it has approached the partner within a predetermined distance (e.g., several meters). This is also done by the output of the image processor 110 or by the output of the IC tag signal receiver 94 (or by both of them). When the result is affirmative, the robot is controlled in S16 to move to further approach the partner up to 1 meter, for example.

Then, the robot 10 is controlled in S18 to determine whether the height of the partner has been recognized. Since the height of the human being who carries the IC tag 92 must be stored in the personal information database 116 as mentioned above and the height can be approximated from the output of the image processor 110, the result in S18 is normally affirmative and next in S20, a desired position of the hand 22R or 22L, specifically a desired position in the vertical direction (i.e., the height) of one of the hands 22 to be taken by the partner, e.g., the right hand 22R is calculated based on the recognized height of the partner. When the result in S18 is negative, an initial value is adopted for the hand position.

Next in S24, the operation of the arm actuator 102 and hand actuator 104 is controlled to drive the arm 20R and the right hand 22R such that the right hand 22R is to be taken by the partner at the calculated position (or that determined by the initial value).

Next in S26, the robot 10 is controlled to determine whether the force component F of the external force detected by the force sensor 78R installed at the right arm 20R is greater than a threshold value Fgrasp in absolute value, or the moment component M of the external force detected by the same sensor is greater than a threshold value Mgrasp in absolute value. The determination in S26 amounts to determining if the partner grasps the hand 22R by a required amount of force. The force component or moment component of the external force is the force and moment components Fx, Fy, Fz, Mx, My and Mz in the X, Y and Z-axis directions as mentioned above.

The determination is repeated until the result becomes affirmative and when it does, the operation of the hand actuator 104 is controlled in S28 to grasp the partner's hand in response to the external force detected by the force sensor 78, more specifically, it is controlled to grasp the partner's hand by the same force as that detected by the force sensor 78.

Next in S30, the load central point, i.e., the central point in the right and direction of the load acting on the robot 10 is calculated. In this embodiment, the robot 10 is expected to make the right hand 22R to be grasped by the partner. However, since the partner may grasp both the hands 22R, 22L, the load central point is calculated whether the partner grasps only the right hand 22R as expected.

Next in S32, the output of the force sensor 78R indicative of the external force is filtered to eliminate high frequency noise.

Next in S34, the robot 10 is again controlled to determine whether the force component F of the external force detected by the force sensor 78R is greater than a threshold value Fwalk in absolute value, or the moment component M of the external force detected by the same sensor is greater than a threshold value Mwalk in absolute value. The threshold values Fwalk, Mwalk are set to be greater than the threshold values Fgrasp, Mgrasp. The determination in S34 amounts to determining whether the partner generates a force necessary for taking the hand 22R to walk. The force will be generated in the direction in which the robot 10 advances, when the robot 10 walks while being taking the hand 22R by the partner.

When the result is affirmative, next in S36, the robot 10 is once again controlled to determine whether the force component F of the external force detected by the force sensor 78R is greater than a threshold value Fchest in absolute value, or the moment component M of the external force detected by the same sensor is greater than a threshold value Mchest in absolute value. The threshold values Fchest, Mchest are set to be greater than the threshold values Fwalk, Mwalk. The determination in S36 amounts to determining whether the partner generates a force greater than necessary, i.e., to determining whether an excessive force acts on the robot 10.

When the result in S36 is affirmative, next in S38, the amount to rotate the haunches (hips) is calculated. Specifically, since the robot 10 is being pulled by the partner by the excessive force, in order to relieve the excessive force, the operation of the aforesaid body actuator is controlled to rotate the upper half 36a of the body link 36 (body 14) relative to the lower half 36b in the same direction as the direction in which the excessive force acts. When the result in S36 is negative, S38 is skipped.

Next in S40, the direction and magnitude of a vector indicative of the external force component F and/or that of the external force moment component M are calculated and next in S44, the gaits (X, Y, THZ) are calculated or generated based on the direction and magnitude of the vector. Specifically, the external force acting from the partner is detected, the direction in which the partner moves is estimated from the detected external force, and based on the estimated direction of movement, the gaits are calculated or generated. Here, THZ indicates the rotation of the haunches calculated in S38. If necessary, the gaits are calculated or generated such that the stride is changed based on the detected external force.

Figure 7:
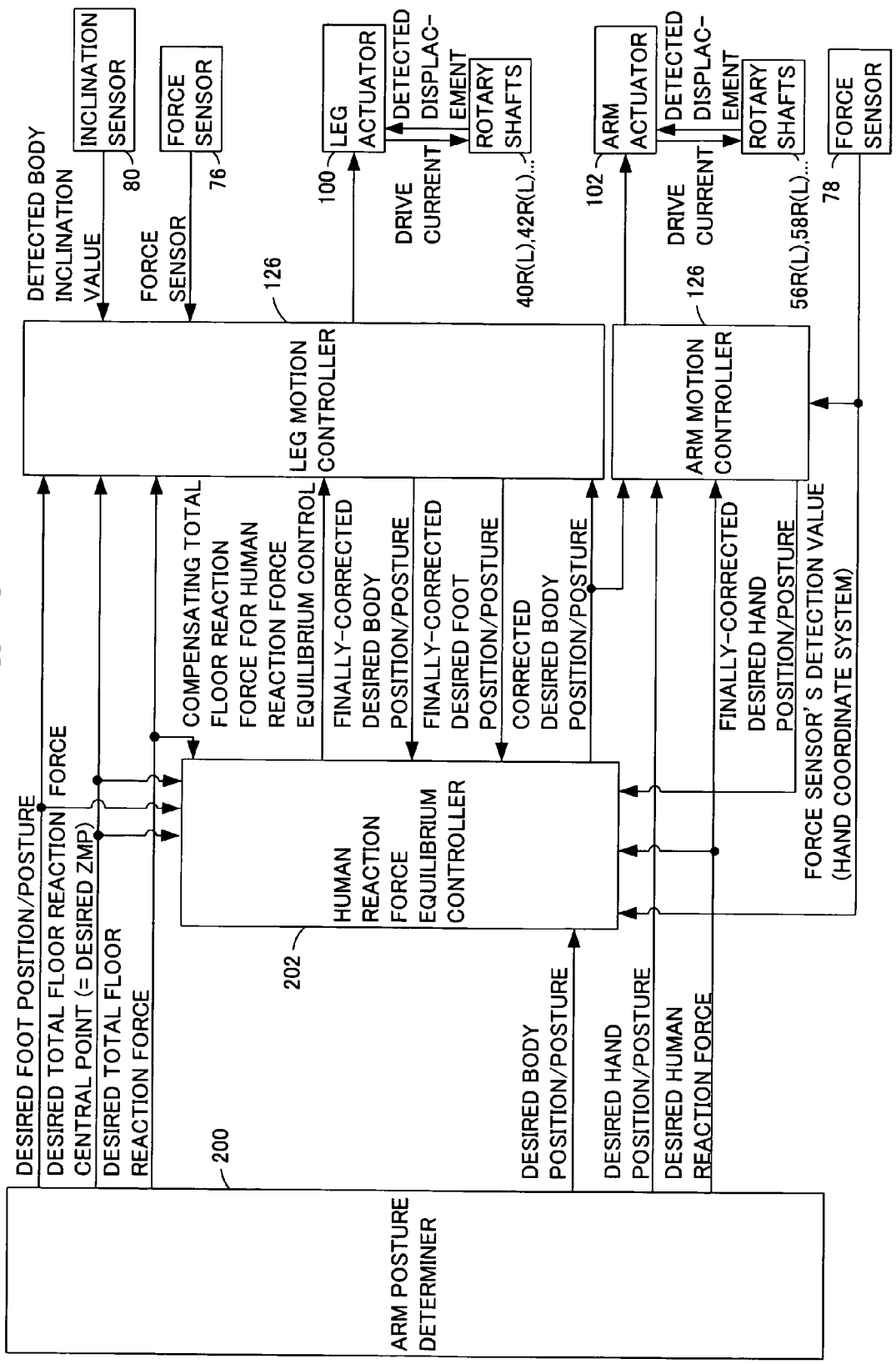
FIG. 7 is a block diagram showing the configuration of the operation controller referred to in the flowchart of FIG. 6.

FIG. 7 is a block diagram showing the configuration of the operation controller 122 in detail. As illustrated, the operation controller 122 includes an arm posture determiner 200, human reaction force equilibrium controller 202, etc. The arm posture determiner 200 calculates the posture of the arm 20 at the time of walking with the hand 22 being taken by the partner, specifically a desired hand position/posture, desired body position/posture, etc.

The human reaction force equilibrium controller 202 calculates a compensating total floor reaction force for human reaction force equilibrium control that satisfies dynamic equilibrium condition and to correct the desired body position/posture, and outputs the calculated compensating total floor reaction force and corrected desired body position/posture to an leg motion controller and the corrected desired body position/posture to an arm motion controller. The leg motion controller and arm motion controller (which are equal to the motion controller 126) control the operation of the leg actuator 100, arm actuator 102, etc.

Specifically, the gaits are calculated or generated in S44 by the arm posture determiner 200 and human reaction force equilibrium controller 202, etc, based on the direction and magnitude of the vector and the other parameters mentioned in FIG. 7.

Next in S46, the calculated gaits are limited to predetermined limits. Specifically, since the motion of the robot 10 is likely to be restricted in the Y-axis direction than that in the X-direction from the nature of the robot 10, the calculated gates are limited to predetermined limits in the Y-axis direction. When the result in S34 is negative, S36 to S46 are skipped and it is determined in S48 that processing to finish the walking is conducted.

Next in S50, command values of the leg actuator 100 are calculated based on the generated gaits and in S52, the operation of the leg actuator 100 is controlled based on the calculated command values.

In parallel with the processing in S50 and S52, command values of the arm actuator 102 are calculated based on the generated gaits in S54 and the operation of the arm actuator 102 is controlled based on the calculated command values in S56.

Further, in parallel with the processing in S54 and S56, command values of the hand actuator 104 are calculated based on the generated gaits in S58 and the operation of the hand actuator 104 is controlled based on the calculated command values in S60, command values of the head actuator 106 are calculated based on the generated gaits in S62 and the operation of the head actuator 106 is controlled based on the calculated command values in S64.

Figure 6:
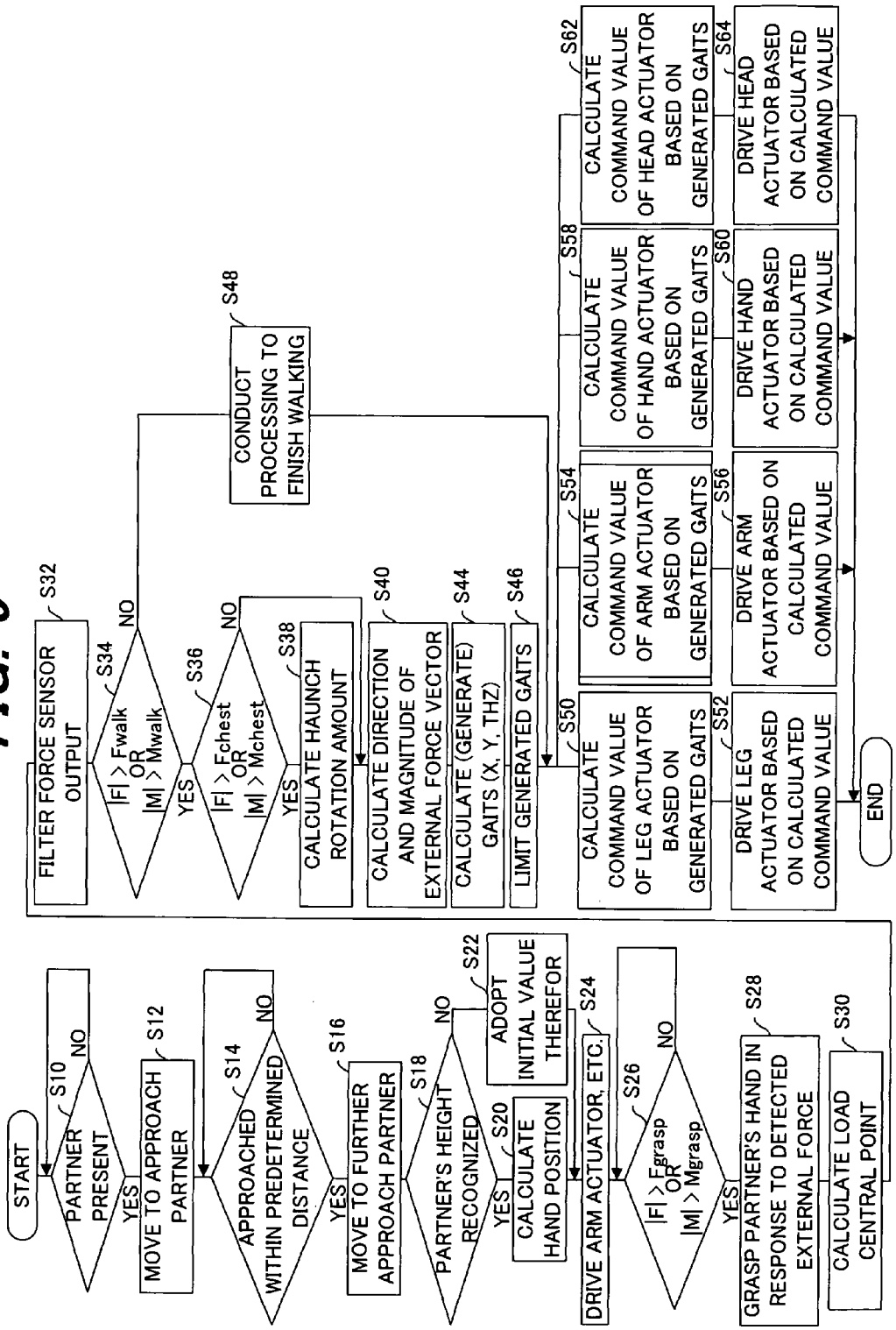
FIG. 6 is a flowchart showing the operation of the electronic control unit, more specifically an operation controller of the electronic control unit illustrated in FIG. 5.
Figure 8:
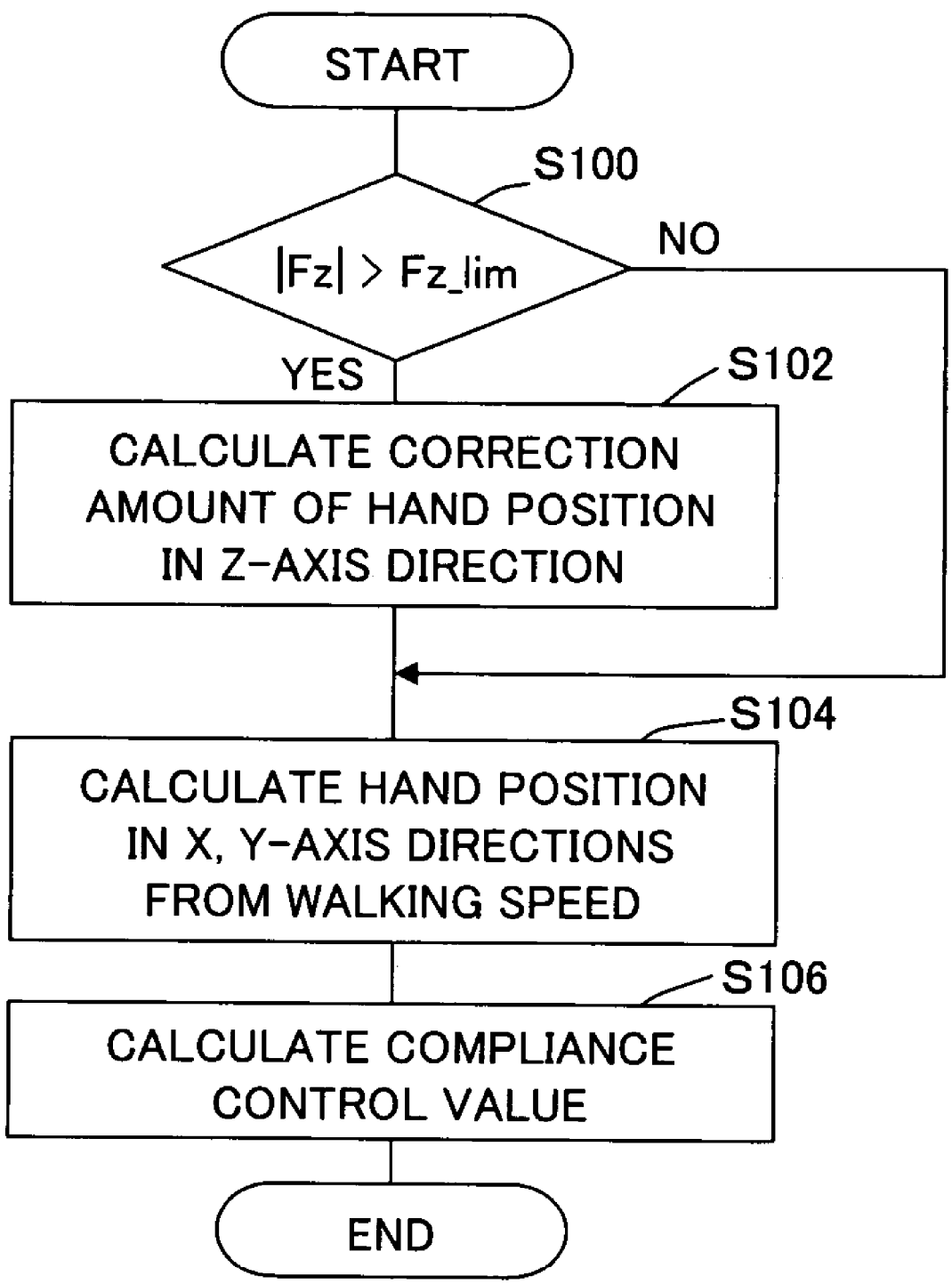
FIG. 8 is a flowchart showing a subroutine of calculation of arm actuator command value in the processing of the flowchart of FIG. 6.

FIG. 8 is a flowchart showing a subroutine of calculation of arm actuator command value in the processing of S54 of the flowchart of FIG. 6.

Explaining this, it is determined in S100 whether the Z-axis direction force component Fz detected by the force sensor 78R is greater than a threshold value Fz_lim in absolute value. When the result is affirmative, a correction amount of the position of the hand 22R in the Z-axis direction is calculated in S102. This amounts to calculating the position of the hand 22R in the vertical axis, i.e., the height of the hand 22R based on the recognized height of the partner. When the result in S100 is negative, S102 is skipped.

Next in S104, the position of the hand 22R in the X, Y-axis directions is calculated and in S106, a control value for compliance control is calculated so as to absorb a slight disturbance, if happened. Based on the calculated value, the compliance control is conducted in the operation of the arm actuator 102 in S56 to avoid the walking from affected by the disturbance.

Figure 9:
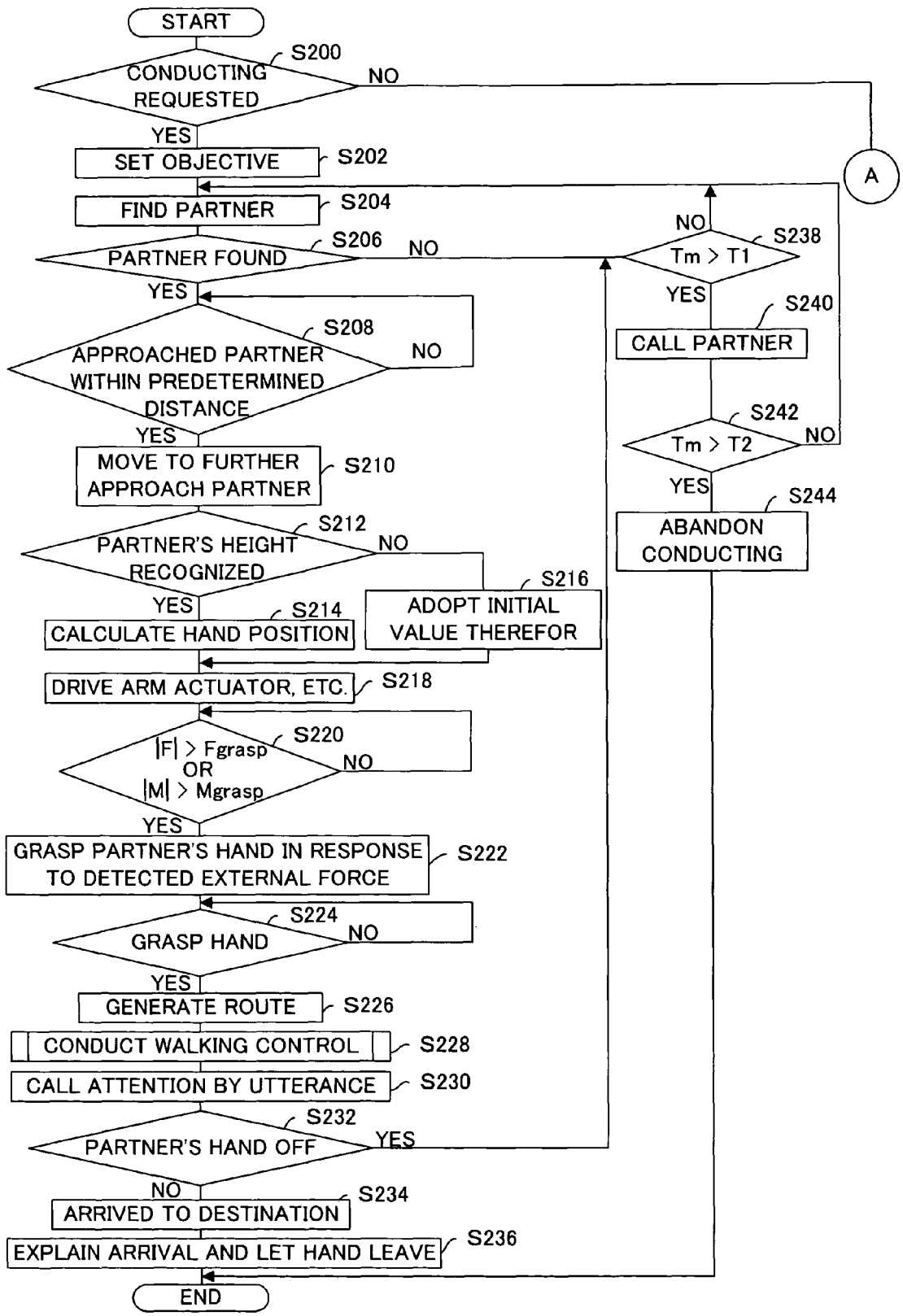
FIG. 9 is a former half of a flowchart showing the operation of a legged mobile control system according to a second embodiment of the invention.
Figure 10:
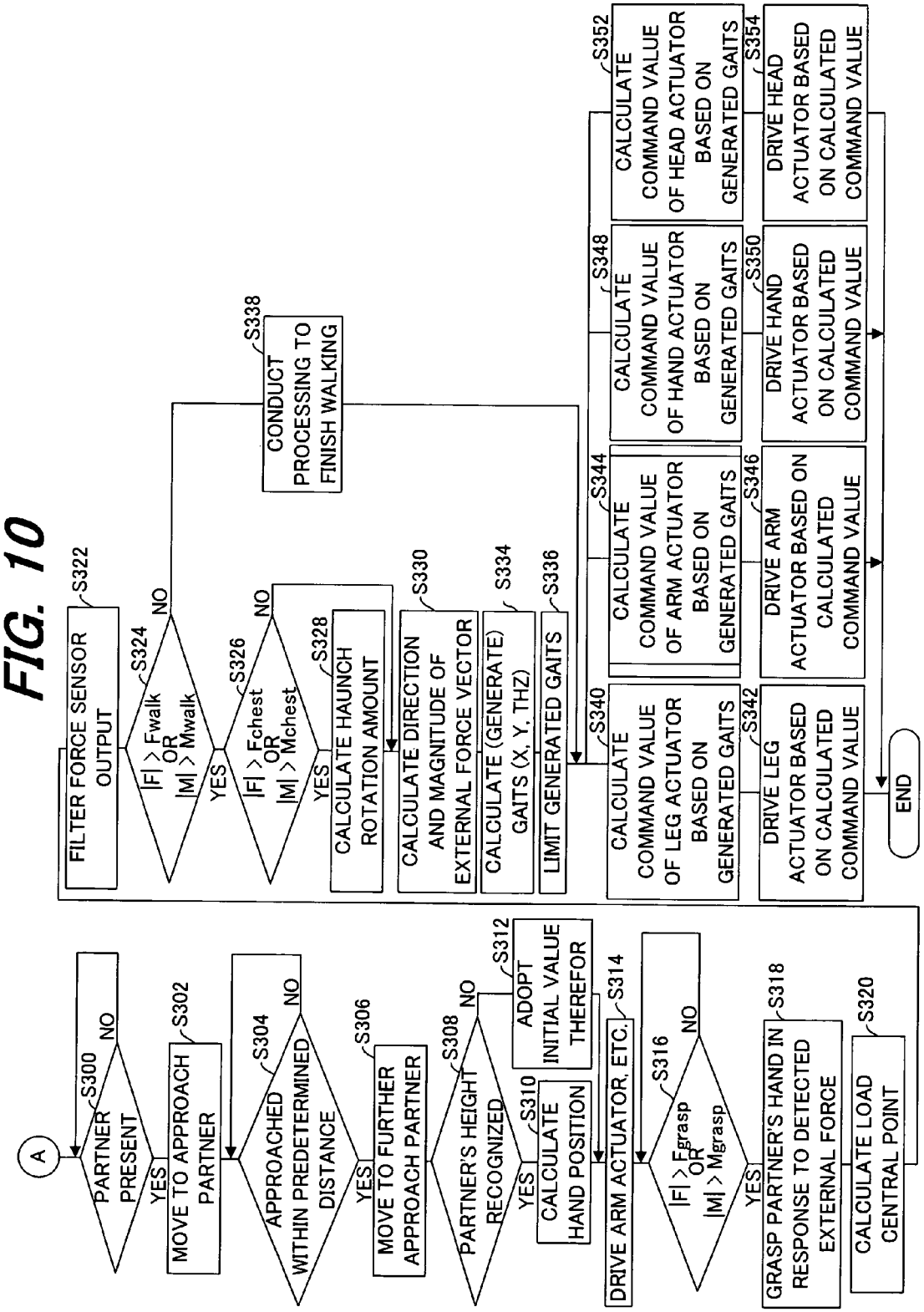
FIG. 10 is a view similar to FIG. 6, but is a latter half of the flowchart of FIG. 9.

FIG. 9 is a former half of a flowchart showing the operation of a legged mobile control system according to a second embodiment of the invention, and FIG. 10 is a view similar to FIG. 6, but is a latter half of the flowchart of FIG. 9.

The operation of the second embodiment is to control the robot to walk by taking a partner's hand by the hand 22R or 22L.

First in S200, the robot 10 is controlled to determine whether conducting a human being is requested. This is done by determining whether an audible instruction to conduct a human being has been inputted by the operator through the voice recognizer 108. The robot 10 may instead be configured to receive any other command or may be configured to have the initial state to perform this task.

When the result in S200 is negative, the program proceeds to S300 and on mentioned in FIG. 10. The processing mentioned in S300 to S354 in the flowchart of FIG. 10 is quite the same as that mentioned in FIG. 6, in which the robot 10 is controlled to walk with the hand 22R or 22L being taken by the human being.

Figure 11:
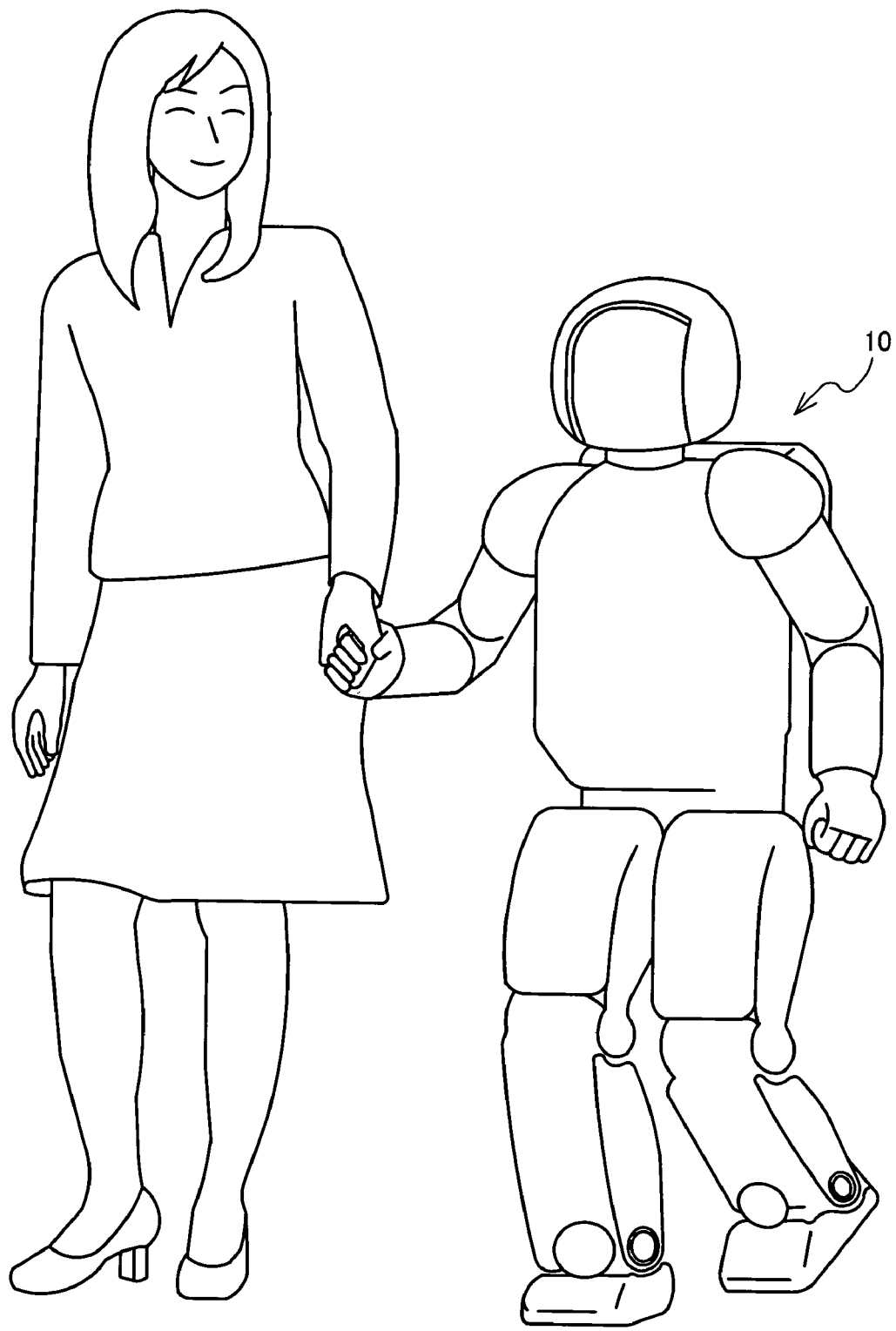
FIG. 11 is an explanatory view showing walking of the robot while taking a human being's hand.

On the other hand, when the result in S200 is affirmative, the program proceeds to S202 and on in which the robot 10 is controlled to walk while taking a human being's hand as shown in FIG. 11.

In S202, the robot 10 is controlled to set the objective in response to the instruction inputted through the voice recognizer 108. For example, it is controlled to set the objective to conduct a human being to a destination such as a reception room.

Next in S204, the robot 10 is controlled to find the human being, i.e., a partner. Similarly to the first embodiment, this is done from the output of the image processor 110 or the identification signal being transmitted from the IC tag 92 to the IC tag signal receiver 94, or by both of them.

Next in S206, the robot 10 is controlled to determine whether the partner is found and when the result is affirmative, the robot 10 is controlled in S208 to determine whether it has approached the partner within a predetermined distance (e.g., several meters) and when the result is affirmative, next in S210, it is controlled to move to further approach the person. The processing from S204 to S210 is very similar to S12 to S16 of the flowchart of FIG. 6 in the first embodiment.

Next, the robot 10 is controlled to determine in S212 whether the height of the partner has been recognized and when the result is affirmative, next in S214, a desired position or height of one of the hands 22 such as the right hand 22R to be used to take the partner's hand in the vertical direction is calculated based on the recognized height of the partner. When the result in S212 is negative, an initial value is adopted therefore in S216.

Next in S218, the operation of the arm actuator 102 and hand actuator 104 is controlled to drive the arm 20R and hand 22R such that the right hand 22R is to take the partner's hand at the calculated position (or that determined by the initial value).

Next in S220, the robot 10 is controlled to determine whether the force component F of the external force detected by the force sensor 78R installed at the right arm 20R is greater than the threshold value Fgrasp in absolute value, or the moment component M of the external force detected by the same sensor is greater than the threshold value Mgrasp in absolute value.

The determination is repeated until the result becomes affirmative and when it does, the operation of the hand actuator 104 is controlled in S222 to grasp the partner's hand in response to the force and moment detected by the force sensor 78, more specifically, it is controlled to grasp the partner's hand by same force as the external force detected by the force sensor 78. The processing in S212 to S222 is the same as that in S18 to S28 in the FIG. 6 flowchart of the first embodiment.

After having being confirmed in S224 that the hand 22R grasps the partner's hand from the output of the force sensor 78, next in S226, a route is generated. Specifically, a route to the destination in the objective set at S202 is set or determined as nodes based on the map information stored in the map database 118. Since the technique to set a route as nodes is described in Japanese Laid-Open Patent Application No. 2006-195969, the description is omitted here.

Next in S228, the walking control is conducted. This processing amounts to generating gaits based on the data stored in the gait database 121 and to controlling the operation of the leg actuator 100, etc., and is specifically equal to the processing in S34 to S64 in the flowchart of FIG. 6 (i.e., the processing in S324 to S354 in the flowchart of FIG. 10). Since the robot 10 walks by taking the hand of the partner, the force generated by the partner, i.e., the direction of the vector will be in the direction opposite to the direction in which the robot 10 advances.

Next in S230, the robot 10 is controlled to call attention of the partner by speaking, for example, as "We will turn the corner," or "Be careful of that step." Next in S232, the robot 10 is controlled to determine whether the partner's hand is off. When the result is negative and when the arrival to the destination is determined in S234, the robot 10 is controlled in S236 to explain the arrival to the partner and to let the partner's hand leave.

Here, explaining the situation where the result in S206 is negative, i.e., when the partner has not been found, the robot 10 is controlled next in S238 to determine whether an elapsed period of time (since the beginning of the partner's finding) Tm exceeds a predetermined value T1 (e.g., 5 seconds). This is the same when the result in S232 is affirmative and it is determined that the partner's hand is off.

At that situation, insofar as the result in S238 is negative, the program proceeds back to S204 such that the robot 10 is controlled to continually try to find the partner for example by calling his/her name. On the other hand, when the result in S238 is affirmative, the robot 10 is controlled in S242 to determine whether the elapsed period of time Tm exceeds a second predetermined value T2 (e.g., 20 seconds).

When the result is negative, the program proceeds back to S204, but when the result is affirmative, the robot 10 is controlled next in S244 to abandon the conducting and the program is terminated. Thus, when the partner has not been found immediately or when it is determined that the partner's hand is off, the finding or searching is continued up to 20 seconds. If failed by that period of time, the conducting is discontinued.

The present exemplary embodiments are thus configured to have system for controlling a legged mobile robot (10) having a body (14), a plurality of legs (12) each connected to the body, a plurality of arms (20) each connected to the body and each having a hand (22) at its distal end, a leg actuator (100) for driving the legs and an arm actuator (102) for driving the arms, comprising: a force sensor (78) which detects an external force acting from a human being when coming in contact with the human being through the hand; and an operation controller (122) which generates gaits based on the detected external force (S228; S328 to S336), and controls operation of at least the leg actuator based on the generated gaits (S228, S340, S342, S344 to S354).

With this, it becomes possible to control the robot to come contact with a human being to establish communication therewith, while enabling to keep a stable posture during the contact.

In the system, the operation controller estimates a direction in which the human being moves based on the detected external force, and generates gaits based on the estimated direction (S38 to S46). With this, it becomes possible to control the robot to come contact with a human being to establish communication therewith, while enabling to keep a stable posture during the contact.

In the system, the generated gaits are gaits for walking by taking a hand of the human being (S200, S228, S328 to S336) or with the hand being taken by the hand of the human being (S328 to S336). With this, it becomes possible to control the robot to establish better communication with a human being, since it is more than a mere contact with the human being.

In the system, the generated gaits are gaits for walking with the hand being taken by the hand of the human being (S38 to S46). With this, it becomes possible to control the robot to establish better communication with a human being, since it is more than a mere contact with the human being.

In the system, the operation controller conducts a compliance control to absorb a disturbance of the external force (S54, S106, S56, S344, S106, S346). With this, it becomes possible to control the robot to keep a more stable posture during the contact.

In the system, the operation controller changes stride based on the detected external force (S44, S228, S334). With this, it becomes possible to control the robot to keep a more stable posture during the contact by changing the stride to absorb the external force.

In the system, the operation controller calculates a position of the hand (22) in a vertical axis based on a recognized height of the human being (S20; S214, S310), and controls operation of the arm actuator such that the hand comes into contact with the human being at the calculated position of the hand (S24, S54, S100 to S106, S218, S314, S344). With this, it becomes possible to control the robot to establish better communication with a human being, since this makes the robot motion more smooth.

The system further includes: an utterance generator (124) which generates utterance; and the operation controller controls operation of the utterance generator to speak to the human being (S230). With this, it becomes possible to control the robot to speak to the human being during conducting, thereby enabling better communication with the human being.

The system further includes: an IC tag signal receiver (94) which receives IC tag signals transmitted from IC tags (92) carried by the human beings; and the operation controller identifies the human being by identifying one of the IC tag signals corresponding to the one of the human beings (S10, S204). With this, it becomes possible to identify the human being surely, thereby enabling to establish better communication with the human being.

The system further includes: a CCD camera (82) installed at the robot for taking an image in the space; and the operation controller identifies the one of the human beings through the image (S10, S204). With this, it becomes possible to identify the human being surely, thereby enabling to establish better communication with the human being.

It should be noted in the above that, although the identification signal is transmitted from the IC tag 92 to the IC tag signal receiver 94 through radio communication, it is possible to utilize identification technique disclosed in Japanese Laid-Open Patent Application 2005-291716.

It should also be noted in the above that, although a biped robot is disclosed as example of the legged mobile robot, this invention can be applied to the robot having three or more legs.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a legged mobile robot having a body, a plurality of legs each connected to the body, a plurality of arms each connected to the body and each having a hand at its distal end, a leg actuator for driving the legs and an arm actuator for driving the arms, comprising:
   a force sensor which detects an external force acting from a human being when coming in contact with the human being through the hand; and
   an operation controller which generates gaits based on the detected external force, and controls operation of at least the leg actuator based on the generated gaits,
   wherein the generated gaits are gaits for walking by taking a hand of the human being or with the hand being taken by the hand of the human being.

2. The system according to claim 1, wherein the operation controller estimates a direction in which the human being moves based on the detected external force, and generates gaits based on the estimated direction.

3. The system according to claim 1, wherein the operation controller conducts a compliance control to absorb a disturbance of the external force.

4. The system according to claim 2, wherein the operation controller conducts a compliance control to absorb a disturbance of the external force.

5. The system according to claim 1, wherein the operation controller changes stride based on the detected external force.

6. The system according to claim 2, wherein the operation controller changes stride based on the detected external force.

7. The system according to claim 1, wherein the operation controller calculates a position of the hand in a vertical axis based on a recognized height of the human being, and controls operation of the arm actuator such that the hand comes into contact with the human being at the calculated position of the hand.

8. The system according to claim 2, wherein the operation controller calculates a position of the hand in a vertical axis based on a recognized height of the human being, and controls operation of the arm actuator such that the hand comes into contact with the human being at the calculated position of the hand.

9. The system according to claim 1, further including:
   an utterance generator which generates utterance;
   and the operation controller controls operation of the utterance generator to speak to the human being.

10. The system according to claim 1, further including:
    an IC tag signal receiver which receives IC tag signals transmitted from IC tags carried by the human beings;
    and the operation controller identifies the human being by identifying one of the IC tag signals corresponding to the one of the human beings.

11. The system according to claim 1, further including:
    a CCD camera installed at the robot for taking an image in the space;
    and the operation controller identifies the one of the human beings through the image.

* * * * *